(12) United States Patent
Oh

(10) Patent No.: US 9,622,141 B2
(45) Date of Patent: Apr. 11, 2017

(54) WIRELESS NETWORK HANDOVER

(71) Applicant: Empire Technology Development LLC, Wilmington, DE (US)

(72) Inventor: Hyun Oh Oh, Gwachon-si (KR)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 14/376,330

(22) PCT Filed: May 31, 2013

(86) PCT No.: PCT/US2013/043533
§ 371 (c)(1),
(2) Date: Aug. 1, 2014

(87) PCT Pub. No.: WO2014/193400
PCT Pub. Date: Dec. 4, 2014

(65) Prior Publication Data
US 2015/0304930 A1    Oct. 22, 2015

(51) Int. Cl.
  *H04W 4/00*   (2009.01)
  *H04W 36/32*  (2009.01)
  *H04W 36/00*  (2009.01)
  *H04W 36/14*  (2009.01)

(52) U.S. Cl.
  CPC .......... *H04W 36/32* (2013.01); *H04W 4/005* (2013.01); *H04W 36/0055* (2013.01); *H04W 36/14* (2013.01)

(58) Field of Classification Search
  CPC .................... H04J 3/04; H04B 5/00
  USPC .......... 370/328–535; 455/552, 569
  See application file for complete search history.

(56) References Cited

U.S. PATENT DOCUMENTS

| | | | |
|---|---|---|---|
| 2007/0297524 A1* | 12/2007 | Jones | H04B 1/1027 375/260 |
| 2010/0172291 A1 | 7/2010 | Kim et al. | |
| 2012/0257556 A1 | 10/2012 | Jung et al. | |
| 2012/0287034 A1 | 11/2012 | Park et al. | |
| 2012/0315927 A1* | 12/2012 | Du | H04W 4/02 455/456.3 |
| 2012/0329505 A1* | 12/2012 | Takagi | H04W 48/20 455/509 |

(Continued)

FOREIGN PATENT DOCUMENTS

| | | |
|---|---|---|
| EP | 2031920 A1 | 3/2009 |
| EP | 2416604 A1 | 2/2012 |
| WO | 2011051182 A1 | 5/2011 |

OTHER PUBLICATIONS

International search Report and written opinion for PCT Application No. PCT/US2013/043533 mailed on Jan. 3, 2014.

*Primary Examiner* — Iqbal Zaidi
(74) *Attorney, Agent, or Firm* — Brundidge & Stanger, P.C.

(57) ABSTRACT

A method performed under control of a receiver device may include receiving, from a sender device, connection information regarding a first apparatus that is connected to the sender device via a machine-to-machine network between the sender device and the receiver device; and connecting to the first apparatus based at least in part on the received connection information after the sender device is disconnected from the first apparatus.

13 Claims, 7 Drawing Sheets

(56) References Cited

U.S. PATENT DOCUMENTS

2013/0095835 A1 4/2013 Carmon et al.
2013/0102314 A1 4/2013 Koskela et al.

* cited by examiner

MOVING DIRECTION OF SENDER DEVICE AND RECEIVER DEVICE

WIRELESS NETWORK HANDOVER

CROSS-REFERENCE TO RELATED APPLICATION

The present application is a U.S. National Stage filing under 35 U.S.C. §371 of International Application No. PCT/US13/43533, filed on May 31, 2013.

BACKGROUND

In a wireless communication system, a mobile device may request or be instructed to handover from a serving base station to a target base station, such as when the mobile device is moving, or when the signal quality of the serving base station degrades, etc. A handover is a process of transferring an ongoing call or data session from one cell to another. Conventionally, the mobile device measures signal strength of a serving cell and neighboring cells and then sends a measurement report to the serving cell. The serving cell then determines whether to instruct the mobile device to handover from the serving cell to a target cell from among the neighboring cells.

SUMMARY

In an example, a method may include: transmitting, by a sender device, connection information regarding an apparatus that is connected to the sender device to a receiver device via a machine-to-machine network between the sender device and the receiver device; receiving, by the receiver device, the connection information from the sender device; receiving, by the apparatus, device information regarding the receiver device through the sender device; disconnecting, by the sender device, from the apparatus; and generating, by the apparatus and the receiver device, a network connection between the apparatus and the receiver device based at least in part on the connection information regarding the apparatus and the device information regarding the receiver device.

In another example, a method performed under control of a receiver device may include: receiving, from a sender device, connection information regarding a first apparatus that is connected to the sender device via a machine-to-machine network between the sender device and the receiver device; and connecting to the first apparatus based at least in part on the received connection information after the sender device is disconnected from the first apparatus.

In yet another example, a receiver device may include: a receiving unit configured to receive, from a sender device, connection information regarding a first apparatus that is connected to the sender device via a machine-to-machine network between the sender device and the receiver device; and a connection control unit configured to connect to the first apparatus based at least in part on the connection information after the sender device is disconnected from the first apparatus. The connection information may include at least one of channel information, traffic information, a signal strength, frequency spectrum information or a location of the first apparatus.

In yet another example, a computer-readable storage medium may store thereon computer-executable instructions that, in response to execution, cause a receiver device to perform operations including: receiving, from a sender device, connection information regarding an apparatus that is connected to the sender device via a machine-to-machine network between the sender device and the receiver device; and connecting to the apparatus based at least in part on the received connection information after the sender device is disconnected from the apparatus.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
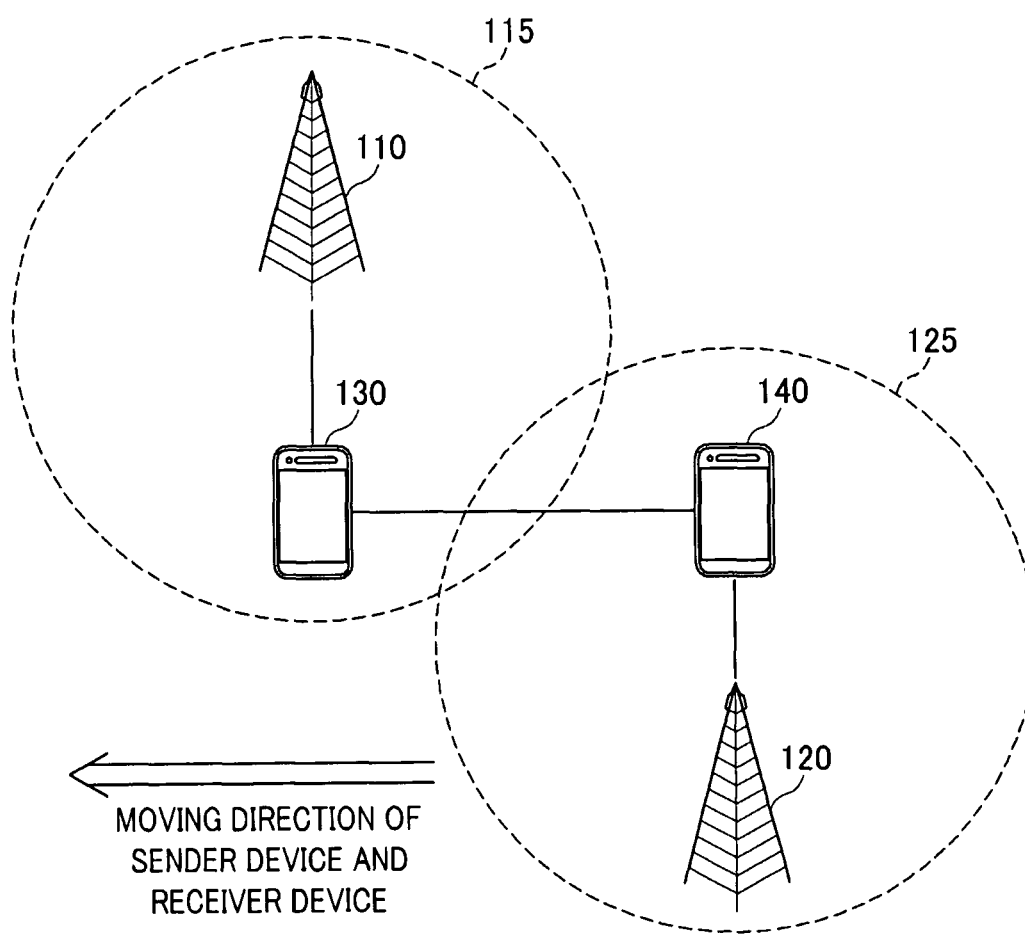
FIGS. 1A and 1B schematically show illustrative examples of a network communication environment including a first apparatus, a second apparatus, a sender device and a receiver device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a wireless network handover. Technologies are generally described for a network communication environment in which a wireless network handover is performed.

In some examples, it may be assumed that a first mobile device is connected to a first base station (e.g., a first eNodeB) and a second mobile device is connected to a second base station (e.g., a second eNodeB). Further, the first mobile device gradually moves away from a network cell of the first base station at a certain speed and the second mobile device gradually approaches the network cell of the first base station at the same speed of the first mobile device. The first mobile device and the second mobile device are connected with each other via a wireless network, especially a machine-to-machine network such as Bluetooth, etc. The first mobile device may transmit, to the second mobile device, connection information regarding a network connection between the first mobile device and the first base station via the machine-to-machine network between the first mobile device and the second mobile device. By way of example, but not limitation, the transmitted connection information may include at least one of channel information of a network channel between the first mobile device and the first base station, traffic information between the first mobile device and the first base station, a signal strength of a signal which is received by the first mobile device from the first base station, frequency spectrum information of the first base station, or a location of the first base station.

The second mobile device may receive the connection information regarding the network connection between the first mobile device and the first base station from the first mobile device. As the second mobile device moves from the vicinity of the second base station to the vicinity of the first base station, a signal strength of a signal which is transmitted from the second base station to the second mobile device may become weakened. Then, the second mobile device may determine to execute a network handover from the second base station to the first base station. The second mobile device may be disconnected from the second base station and be connected to the first base station based at least in part on the received connection information regarding the network connection to the first base station.

Accordingly, the second mobile device may easily execute a network handover from the second base station to the first base station by using the connection information inherited from the first mobile device without a power consuming or time consuming process of a handover process such as a signal scanning process or a negotiation process.

Figure 1B:
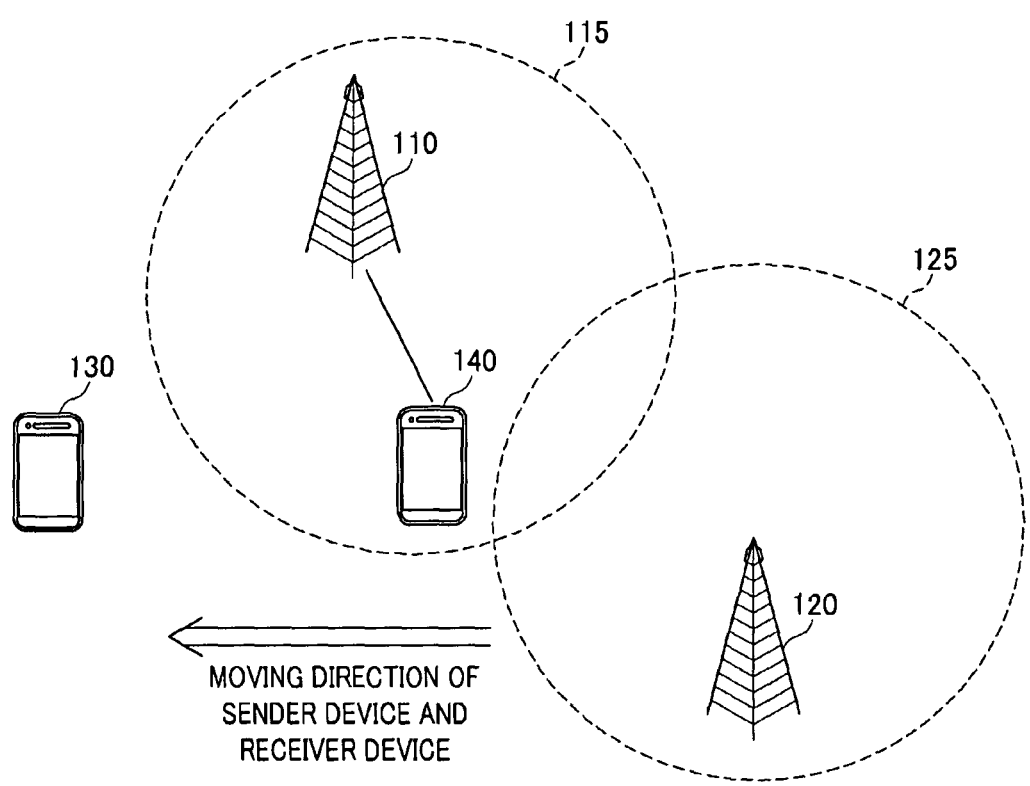

FIGS. 1A and 1B schematically show illustrative examples of a network communication environment including a first apparatus 110, a second apparatus 120, a sender device 130 and a receiver device 140, arranged in accordance with at least some embodiments described herein. By way of example, but not limitation, first apparatus 110 and second apparatus 120 may respectively include at least one of a base station, an access point, a mobile device, a building, or a structure (such as a traffic light, a streetlight, or a billboard that has a network communication function). The base station may be a wireless communications station installed at a fixed location and used to provide communication services. For example, the base station may provide an end device with a wireless local area network such as a Wi-Fi network or a mobile telecommunications network including a 3rd generation (3G) mobile telecommunications network, a 4th generation (4G) mobile telecommunications network, and any other mobile telecommunications networks.

Further, sender device 130 and receiver device 140 may respectively include to a mobile device, a portable device, a notebook, a personal computer, a personal communication terminal, such as PCS (Personal Communication System), GSM (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and WiBro (Wireless Broadband Internet) terminals.

As depicted in FIG. 1A, sender device 130 may be connected to first apparatus 110. For example, sender device 130 may be within a predetermined range of a network cell 115 of first apparatus 110, and first apparatus 110 may provide sender device 130 with a wireless local area network such as a Wi-Fi network. Further, receiver device 140 may be connected to second apparatus 120. For example, receiver device 140 may be within a predetermined range of a network cell 125 of second apparatus 120, and second apparatus 120 may provide receiver device 140 with a wireless local area network such as a Wi-Fi network.

Further, sender device 130 and receiver device 140 may be connected to each other via a wireless network including a machine-to-machine network such as a near field communication (NFC), Bluetooth, or peer to peer (P2P) communication protocol, etc.

In some embodiments, it may be assumed that sender device 130 gradually moves away from network cell 115 of first apparatus 110 at a certain speed. Further, receiver device 140 gradually moves away from network cell 125 of second apparatus 120 and approaches network cell 115 of first apparatus 110 at a certain speed. By way of example, but not limitation, the moving speed of sender device 130 and receiver device 140 may be the same and a moving direction of sender device 130 and receiver device 140 may be the same (e.g., east, west, north, or south).

In some embodiments, since sender device 130 has route information regarding movement parameters of sender device 130 such as the moving speed, the moving direction or moving destination, sender device 130 may predict the moment when sender device 130 gets out of network cell 115 of first apparatus 110 and is disconnected from first apparatus 110. Further, since receiver device 140 has route information regarding movement parameters of receiver device 140 such as the moving speed, the moving direction or moving destination, receiver device 140 may predict the moment when receiver device 140 gets out of network cell 125 of second apparatus 120 and is disconnected from second apparatus 120.

Further, sender device 130 and receiver device 140 may be configured to exchange the route information of sender device 130 and receiver device 140 via the wireless network including the machine-to-machine network between sender device 130 and receiver device 140. Thus, sender device 130 may have the movement parameters of receiver device 140 and receiver device 140 may have the movement parameters of sender device 130. As a result, sender device 130 may predict the moment when receiver device 140 gets out of network cell 125 of second apparatus 120 and comes in network cell 115 of first apparatus 110. Further, receiver device 140 may predict the moment when sender device 130 gets out of network cell 115 of first apparatus 110 and is disconnected from first apparatus 110.

In some embodiment, sender device 130 may be configured to transmit, to receiver device 140, connection information regarding a network connection to first apparatus 110. Sender device 130 may transmit the connection information to receiver device 140 via the wireless network including the machine-to-machine network between sender device 130 and receiver device 140. Alternatively, sender device 130 may broadcast the connection information periodically. By way of example, but not limitation, the connection information may include at least one of channel information of first apparatus 110, traffic information of first apparatus 110, signal strength of a signal which is transmitted from first apparatus 110, frequency spectrum information regarding first apparatus 110 or a location of first apparatus 110. Then, receiver device 140 may receive the connection information from sender device 130.

In some embodiment, sender device 130 may be configured to transmit device information regarding receiver device 140 to first apparatus 110. By way of example, but not limitation, the device information regarding receiver device 140 may include at least one of an identifier of receiver device 140, the moving speed of receiver device 140, the moving direction of receiver device 140 or the destination of receiver device 140. Therefore, first apparatus 110 may predict that receiver device 140 may be connected to first apparatus 110 after sender device 130 is disconnected form first apparatus 110. Further, if there is need for sender device 130 to transmit, to first apparatus 110, device information that demands high security, such as a unique identifier or a password of receiver device 140, sender device 130 may transmit, to first apparatus 110, temporal device information such as a temporal unique identifier or a temporal password of receiver device 140 that is used by second apparatus 120 to identify receiver device 140.

In some embodiments, sender device 130 may be configured to transmit, to receiver device 140, the connection information based on consideration of the received route information of receiver device 140, which include at least one of the moving speed, the moving direction or moving destination of receiver device 140. Further, receiver device 140 may be configured to receive the connection information from sender device 130 based on the route information of receiver device 140, which include at least one of the moving speed, the moving direction, or moving destination of receiver device 140. Sender device 130 may be configured to compare the connection information with the received route information of receiver device 140 and determine whether the connection information corresponds to the route information of receiver device 140. That is, sender device 130 may be configured to determine whether receiver device 140 will connect to first apparatus 110 by using the connection information. Then, when sender device 130 determined that the connection information corresponds to the route information of receiver device 140, sender device 130 may transmit the connection information to receiver device 140.

In some embodiments, receiver device 140 may be configured to compare the transmitted connection information with the route information of receiver device 140 and determine whether the connection information which is transmitted from sender device 130 corresponds to the route information of receiver device 140. That is, receiver device 140 may be configured to determine whether receiver device 140 will use the connection information to execute a handover from second apparatus 120 to first apparatus 110 based on consideration of the route information of receiver device 140. Then, when receiver device 140 determined that the connection information corresponds to the route information of receiver device 140, receiver device 140 may receive the connection information from sender device 130.

Otherwise, when receiver device 140 determined that the connection information does not correspond to the route information of receiver device 140, receiver device 140 may stop receiving the connection information from sender device 130. Alternatively, receiver device 140 may transmit the received connection information to sender device 130, if the received connection information does not correspond to the route information of receiver device 140.

In some embodiments, receiver device 140 may select a part of the connection information based on the route information of receiver device 140 and use the selected part of the connection information to execute a handover from second apparatus 120 to first apparatus 110.

In some embodiments, as receiver device 140 moves from the vicinity of second apparatus 120 to the vicinity of first apparatus 110, signal strength of a signal which is transmitted from second apparatus 120 to receiver device 140 may become weakened. Then, receiver device 140 may prepare a network handover from second apparatus 120 to first apparatus 110 by using the received connection information.

Receiver device 140 may be configured to transmit the received connection information to second apparatus 120 to which receiver device 140 is connected. That is, receiver device 140 may report, to second apparatus 120, at least one of the channel information of first apparatus 110, the traffic information of first apparatus 110, the signal strength of first apparatus 110, the frequency spectrum information regarding first apparatus 110.

Second apparatus 120 may be configured to determine whether the signal strength of first apparatus 110 is higher than a predetermined value and the signal strength of second apparatus 120 is lower than a predetermined value. When second apparatus 120 determines that the signal strength of first apparatus 110 is higher than the predetermined value and the signal strength of second apparatus 120 is lower than the predetermined value, second apparatus 120 may be configured to transmit, to receiver device 140, a command for receiver device 140 to disconnect from second apparatus 120 and to connect to first apparatus 110.

Alternatively, second apparatus 120 may be configured to compare the signal strength of first apparatus 110 with the signal strength of second apparatus 120. Upon comparing, if the signal strength of first apparatus 110 is higher than the signal strength of second apparatus 120, second apparatus 120 may be configured to transmit, to receiver device 140, a command for receiver device 140 to disconnect from second apparatus 120 and to connect to first apparatus 110.

In some embodiments, at the time or after sender device 130 gets out of network cell 115 of first apparatus 110 so sender device 130 is disconnected from first apparatus 110, receiver device 140 may be disconnected from second apparatus 120 in response to the receipt of the command. Further, a network connection may be generated between first apparatus 110 and receiver device 140 and receiver device 140 may connect to first apparatus 110 based on the connection information received from sender device 130.

Figure 2:
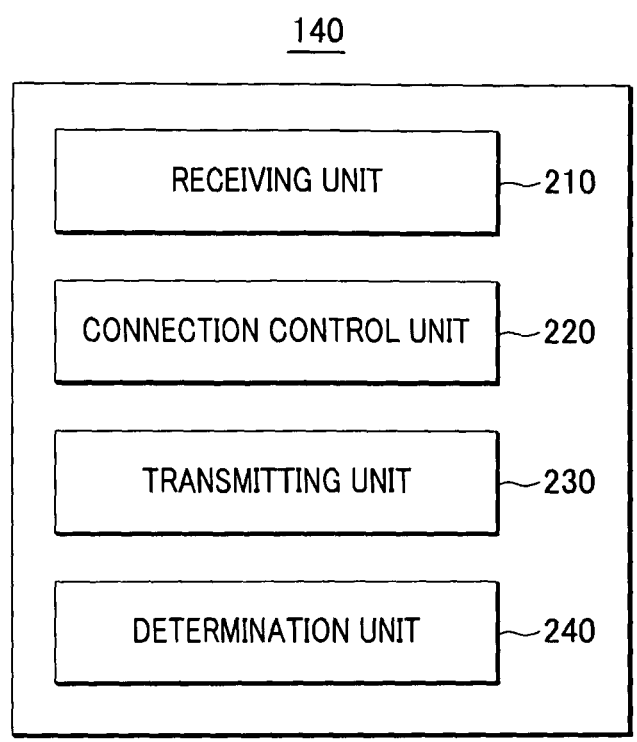
FIG. 2 shows a schematic block diagram illustrating an example architecture for a receiver device, arranged in accordance with at least some embodiments described herein.

FIG. 2 shows a schematic block diagram illustrating an example architecture for a receiver device 140, arranged in accordance with at least some embodiments described herein. As depicted in FIG. 2, receiver device 140 may include a receiving unit 210, a connection control unit 220, a transmitting unit 230, and a determination unit 240. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of receiving unit 210, connection control unit 220, transmitting unit 230, and determination unit 240 may be included in an instance of an application hosted on receiver device 140.

Receiving unit 210 may be configured to receive, from sender device 130, connection information regarding first apparatus 110 which is connected to sender device 130 via a wireless network including a machine-to-machine network between sender device 130 and receiver device 140. By way of example, but not limitation, the connection information may include at least one of channel information regarding first apparatus 110, traffic information regarding first apparatus 110, a signal strength of a signal which is transmitted from first apparatus 110, frequency spectrum information regarding first apparatus 110 or a location of first apparatus 110.

Further, receiving unit 210 may be configured to receive, from sender device 130, route information regarding movement parameters of sender device 130 such as the moving speed, the moving direction or the moving destination via the wireless network.

Further, receiving unit 210 may be configured to receive, from second apparatus 120 which is connected to receiver device 140, a command to disconnect from second apparatus 120 and to connect to first apparatus 110 via a wireless network.

Connection control unit 220 may be configured to connect to first apparatus 110 based on the connection information received by receiving unit 210 at the same time or after sender device 130 is disconnected from first apparatus 110.

Further, connection control unit 220 may be configured to disconnect from second apparatus 120 in response to the receipt of the command from second apparatus 120.

Transmitting unit 230 may be configured to transmit the connection information received by receiving unit 210 to second apparatus 120 which is connected to receiver device 140 via a wireless network. In some embodiments, transmitting unit 230 may be configured to transmit the connection information to second apparatus 120 before connection control unit 220 disconnects from second apparatus 120 to report the receipt of the connection information to second apparatus 120.

Further, transmitting unit 230 may be configured to transmit, to sender device 130, route information regarding movement parameters of receiver device 140 such as the moving speed, the moving direction or the moving destination via the wireless network.

Further, transmitting unit 230 may be configured to return the received connection information to sender device 130, if the received connection information does not correspond to the route information of receiver device 140.

Determination unit 240 may be configured to compare the received connection information with the route information of receiver device 140. Further, determination unit 240 may be configured to determine whether the connection information corresponds to the route information of receiver device 140. That is, determination unit 240 may determine whether receiver device 140 will use the connection information to execute a handover from second apparatus 120 to first apparatus 110 based on consideration of the route information of receiver device 140.

Further, determination unit 240 may be configured to control receiving unit 210 to stop receiving the connection information, if determination unit 240 determined that the connection information does not correspond to the route information of receiver device 140. Further, determination unit 240 may be configured to control transmitting unit 230 to return the received connection information to sender device 130, if determination unit 240 determined that the connection information does not correspond to the route information of receiver device 140.

Figure 3:
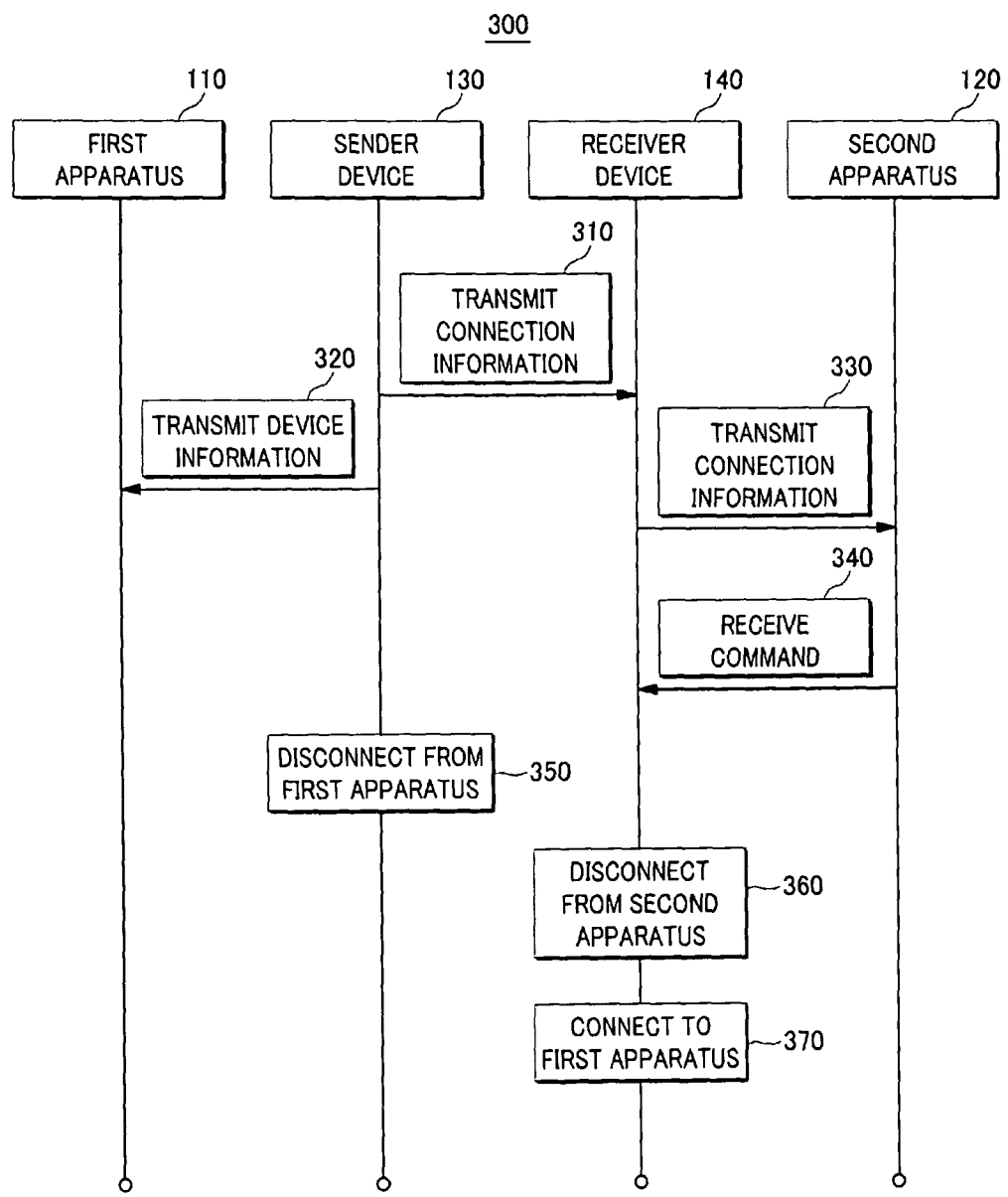
FIG. 3 shows an example flow diagram of a process for performing a wireless network handover, arranged in accordance with at least some embodiments described herein.

FIG. 3 shows an example flow diagram of a process 300 for performing a wireless network handover, arranged in accordance with at least some embodiments described herein. The method in FIG. 3 may be implemented in network communication environment including first apparatus 110, second apparatus 120, sender device 130 and receiver device 140, as illustrated in FIGS. 1A and 1B. An example process may include one or more operations, actions, or functions as illustrated by one or more blocks 310, 320, 330, 340, 350, 360 and/or 370. Although illustrated as discrete blocks, various blocks may be divided into additional blocks, combined into fewer blocks, or eliminated, depending on the desired implementation. Processing may begin at block 310.

At block 310 (Transmit Connection Information), sender device 130 may be configured to transmit, to receiver device 140, connection information regarding first apparatus 110 which is connected to sender device 130 via a wireless network including a machine-to-machine network between sender device 130 and receiver device 140. Further, receiver device 140 may receive the connection information. By way of example, but not limitation, the connection information may include at least one of channel information regarding first apparatus 110, traffic information regarding first apparatus 110, signal strength of a signal which is transmitted from first apparatus 110, frequency spectrum information regarding first apparatus 110 or a location of first apparatus 110. Processing may proceed from block 310 to block 320.

At block 320 (Transmit Device Information), sender device 130 may be configured to transmit device information regarding receiver device 140 to first apparatus 110. By way of example, but not limitation, the device information regarding receiver device 140 may include at least one of an identifier of receiver device 140, the moving speed of receiver device 140, the moving direction of receiver device 140 or the destination of receiver device 140. Therefore, first apparatus 110 may predict that receiver device 140 may be connected to first apparatus 110 after sender device 130 is disconnected form first apparatus 110. Processing may proceed from block 320 to block 330.

At block 330 (Transmit Connection Information), receiver device 140 may transmit the connection information received at block 310 to second apparatus 120 to which receiver device 140 is connected. That is, receiver device 140 may report at least one of the channel information regarding first apparatus 110, the traffic information regarding first apparatus 110, the signal strength of first apparatus 110, the frequency spectrum information regarding first apparatus 110 to second apparatus 120. Processing may proceed from block 330 to block 340.

At block 340 (Receive Command), receiver device 140 may be configured to receive, from second apparatus 120, a command to disconnect from second apparatus 120 and to connect to first apparatus 110. In some embodiments, at block 340, second apparatus 120 may be configured to determine whether the signal strength of first apparatus 110 is higher than a predetermined value and the signal strength of second apparatus 120 is lower than a predetermined value. Alternatively, at block 340, second apparatus 120 may be configured to compare the signal strength of first apparatus 110 with the signal strength of second apparatus 120. When second apparatus 120 determines that the signal strength of first apparatus 110 is higher than the predetermined value and the signal strength of second apparatus 120 is lower than the predetermined value, second apparatus 120 may be configured to transmit, to receiver device 140, the command for receiver device 140 to disconnect from second apparatus 120 and to connect to first apparatus 110. Alternatively, upon comparing if the signal strength of first apparatus 110 is higher than the signal strength of second apparatus 120, second apparatus 120 may be configured to transmit, to receiver device 140, the command for receiver device 140 to disconnect from second apparatus 120 and to connect to first apparatus 110. Processing may proceed from block 340 to block 350.

At block 350 (Disconnect from First Apparatus), sender device 130 may be configured to get out of network cell 115 of first apparatus 110, so sender device 130 may be disconnected from first apparatus 110. Processing may proceed from block 350 to block 360.

At block 360 (Disconnect from Second Apparatus), receiver device 140 may be disconnected from second apparatus 120 in response to the receipt of the command received at block 340. Processing may proceed from block 360 to block 370.

At block 370 (Connect to First Apparatus), receiver device 140 may be configured to connect to first apparatus 110 based on the connection information received at block 310, so a network connection may be generated between first apparatus 110 and receiver device 140.

Figure 4:
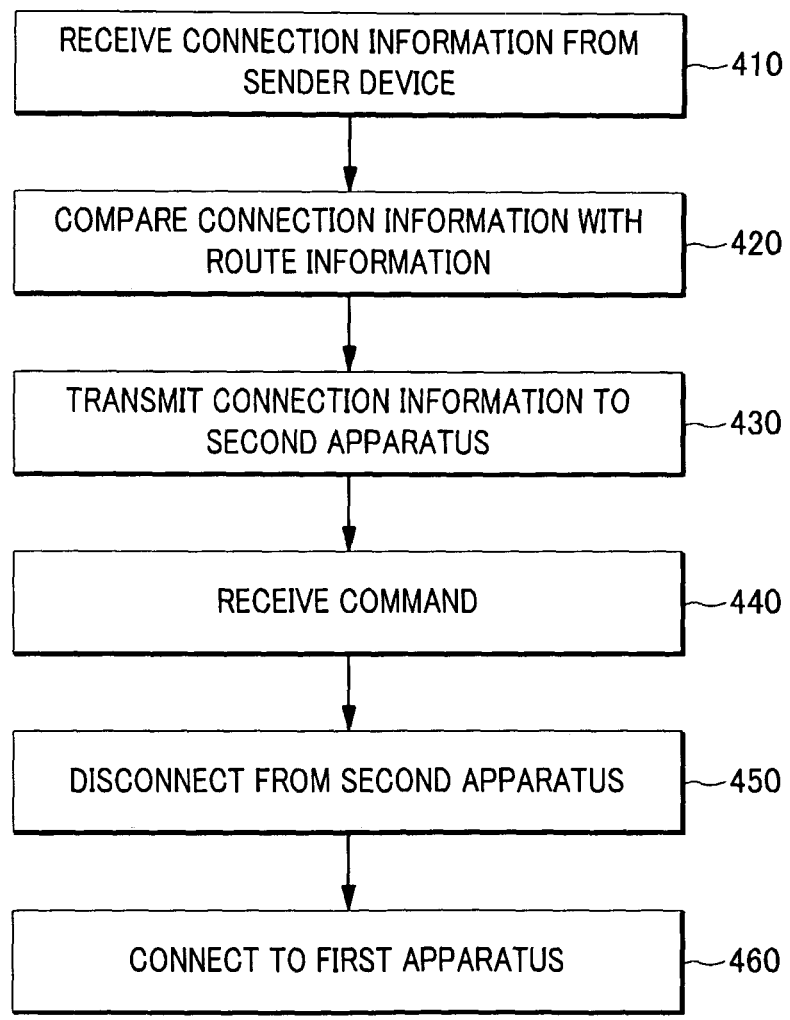
FIG. 4 shows an example flow diagram of a process of a receiver device for performing a wireless network handover, arranged in accordance with at least some embodiments described herein.

FIG. 4 shows an example flow diagram of a process 400 of a receiver device 140 for performing a wireless network handover, arranged in accordance with at least some embodiments described herein. The method in FIG. 4 may be implemented in network communication environment including first apparatus 110, second apparatus 120, sender device 130 and receiver device 140, as illustrated in FIGS. 1A and 1B. An example process may include one or more operations, actions, or functions as illustrated by one or more blocks 410, 420, 430, 440, 450 and/or 460. Although illustrated as discrete blocks, various blocks may be divided into additional blocks, combined into fewer blocks, or eliminated, depending on the desired implementation. Processing may begin at block 410.

At block 410 (Receive Connection Information), receiver device 140 may be configured to receive, from sender device 130, connection information regarding first apparatus 110 which is connected to sender device 130 via a wireless network including a machine-to-machine network between sender device 130 and receiver device 140. By way of example, but not limitation, the connection information may include at least one of channel information of first apparatus 110, traffic information of first apparatus 110, signal strength of a signal which is transmitted from first apparatus 110, frequency spectrum information regarding first apparatus 110 or a location of first apparatus 110. Processing may proceed from block 410 to block 420.

At block 420 (Compare Connection Information with Route Information), receiver device 140 may be configured to compare the connection information received at block 410 with route information of receiver device 140. By way of example, but not limitation, the route information of receiver device 140 may include at least one of the moving speed, the moving direction or the moving destination of receiver device 140.

Further, at block 420, receiver device 140 may be configured to determine whether the connection information corresponds to the route information of receiver device 140. That is, receiver device 140 may determine whether receiver device 140 will use the connection information to execute a handover from second apparatus 120 to first apparatus 110 based on consideration of the route information of receiver device 140.

At block 420, when receiver device 140 determined that the connection information corresponds to the route information of receiver device 140, receiver device 140 may be configured to continue to receive the connection information from sender device 130.

Otherwise, at block 420, when receiver device 140 determined that the connection information does not correspond to the route information of receiver device 140, receiver device 140 may be configured to stop receiving the connection information from sender device 130. Further, receiver device 140 may be configured to return the received connection information to sender device 130, if connection information does not correspond to the route information of receiver device 140. Processing may proceed from block 420 to block 430.

At block 430 (Transmit Connection Information to Second Apparatus), receiver device 140 may be configured to transmit the connection information received at block 410 to second apparatus 120 to which receiver device 140 is connected. That is, at block 430, receiver device 140 may report, to second apparatus 120, at least one of the channel information regarding first apparatus 110, the traffic information regarding first apparatus 110, the signal strength of first apparatus 110, the frequency spectrum information regarding first apparatus 110. Processing may proceed from block 430 to block 440.

At block 440 (Receive Command), receiver device 140 may be configured to receive, from second apparatus 120, a command to disconnect from second apparatus 120 and to connect to first apparatus 110. In some embodiments, second apparatus 120 may transmit, to receiver device 140, the command for receiver device 140 to disconnect from second apparatus 120 and to connect to first apparatus 110 upon considering the connection information received at block 430. Processing may proceed from block 440 to block 450.

At block 450 (Disconnect from Second Apparatus), receiver device 140 may be disconnected from second apparatus 120 in response to the receipt of the command received at block 440. Processing may proceed from block 450 to block 460.

At block 460 (Connect to First Apparatus), receiver device 140 may be configured to connect to first apparatus 110 based on the connection information received at block 310, so a network connection may be generated between first apparatus 110 and receiver device 140.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
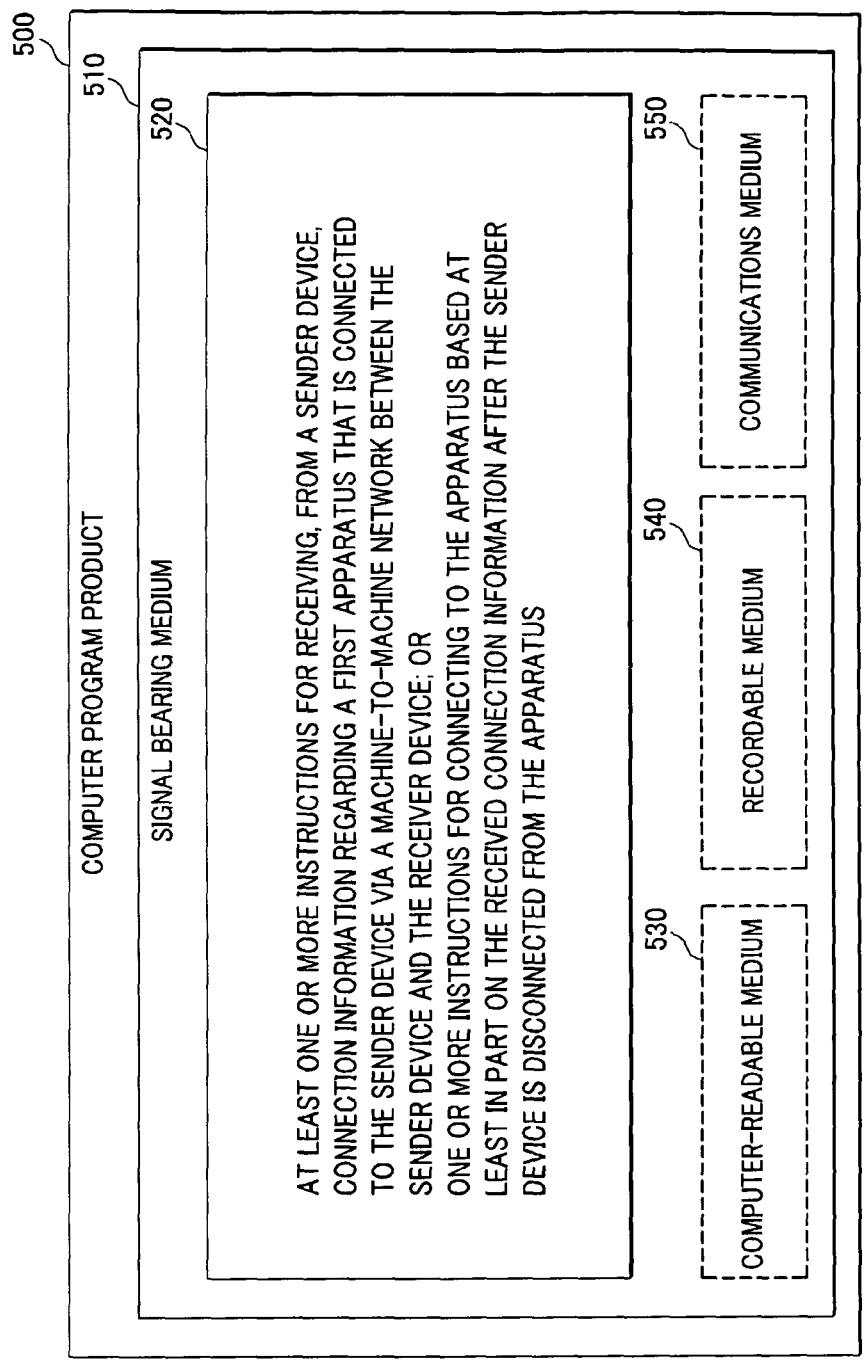
FIG. 5 illustrates a computer program product that may be utilized to provide a scheme for performing a wireless network handover, arranged in accordance with at least some embodiments described herein.

FIG. 5 illustrates a computer program product that may be utilized to provide a scheme for performing a wireless network handover, arranged in accordance with at least some embodiments described herein. Computer program product 500 may include a signal bearing medium 510. Signal bearing medium 510 may include one or more instructions 520 that, when executed by, for example, a processor, may provide the functionality described above with respect to FIGS. 1A-4. By way of example, instructions 520 may include: one or more instructions for receiving, from a sender device, connection information regarding a first apparatus that is connected to the sender device via a machine-to-machine network between the sender device and the receiver device; and one or more instructions for connecting to the apparatus based at least in part on the received connection information after the sender device is disconnected from the apparatus. Thus, for example, referring to FIG. 4, receiver device 140 may undertake one or more of the blocks shown in FIG. 4 in response to instructions 520.

In some implementations, signal bearing medium 510 may encompass a computer-readable medium 530, such as, but not limited to, a hard disk drive, a CD, a DVD, a digital tape, memory, etc. In some implementations, signal bearing medium 510 may encompass a recordable medium 540, such as, but not limited to, memory, read/write (R/W) CDs, R/W DVDs, etc. In some implementations, signal bearing medium 510 may encompass a communications medium 550, such as, but not limited to, a digital and/or an analog communication medium (e.g., a fiber optic cable, a waveguide, a wired communications link, a wireless communication link, etc.). Thus, for example, computer program product 500 may be conveyed to one or more modules of receiver device 140 by an RF signal bearing medium 510, where the signal bearing medium 510 is conveyed by a wireless communications medium 550 (e.g., a wireless communications medium conforming with the IEEE 802.11 standard).

Figure 6:
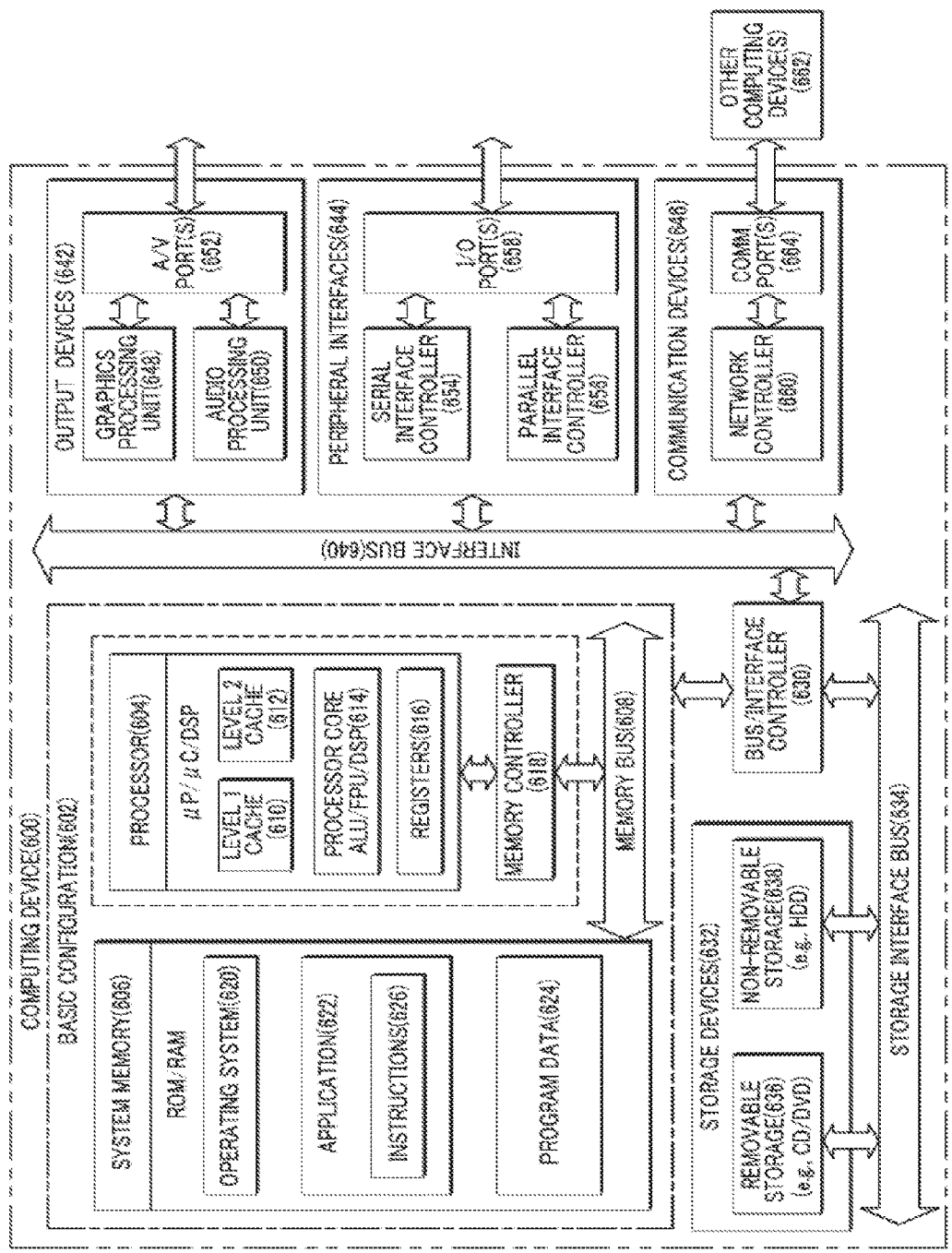
FIG. 6 is a block diagram illustrating an example computing device that may be utilized to provide a scheme for performing a wireless network handover, arranged in accordance with at least some embodiments described herein.

FIG. 6 is a block diagram illustrating an example computing device that may be utilized to provide a scheme for performing a wireless network handover, arranged in accordance with at least some embodiments described herein. In these examples, elements of computing device 600 may be arranged or configured for a device. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (g), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), nonvolatile memory (such as ROM, flash memory, etc.) or any combination thereof. System memory 606 may include an operating system 620, an application 622, and program data 624. Application 622 may include instructions 626 that may be arranged to perform the functions as described herein including the actions described with respect to receiver device 140 architecture as shown in FIG. 2 or including the actions described with respect to the flow charts shown in FIG. 4. In some examples, application 622 may be arranged to operate with program data 624 on an operating system 820 such that the schemes for performing a wireless network handover.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
   transmitting, by a sender device, connection information regarding a first apparatus that is connected to the sender device, wherein the transmitting by the sender device is to a receiver device that is connected to a second apparatus and wherein the transmitting is via a machine-to-machine network between the sender device and the receiver device;
   receiving, by the receiver device, the connection information from the sender device;
   receiving, by the first apparatus, device information regarding the receiver device through the sender device;
   receiving, by the second apparatus, the connection information from the receiver device before the receiver device connects to the first apparatus;
   disconnecting, by the sender device, from the first apparatus;
   disconnecting, by the receiver device, from the second apparatus; and generating, by the first apparatus and the receiver device, a network connection between the first apparatus and the receiver device based at least in part on the connection information regarding the first apparatus and the device information regarding the receiver device, wherein the first apparatus includes a first base station and the second apparatus includes a second base station.

2. The method of claim 1, wherein the connection information regarding the first apparatus includes at least one of channel information, traffic information, a signal strength, frequency spectrum information, or a location of the first apparatus.

3. The method of claim 1, wherein the device information regarding the receiver device includes at least one of an identifier of the receiver device, a speed of the receiver device, a moving direction of the receiver device, or a destination of the receiver device.

4. A method performed under control of a receiver device, the method comprising:
receiving, from a sender device, connection information regarding a first apparatus that is connected to the sender device, wherein the connection information is received via a machine-to-machine network between the sender device and the receiver device;
connecting to the first apparatus based at least in part on the received connection information after the sender device is disconnected from the first apparatus;
prior to connecting to the first apparatus, transmitting the received connection information to a second apparatus that is connected to the receiver device;
receiving, from the second apparatus, a command to disconnect from the second apparatus and to connect to the first apparatus; and
disconnecting from the second apparatus,
wherein the first apparatus includes a first base station, and wherein the second apparatus includes a second base station.

5. The method of claim 4, wherein the connection information regarding the first apparatus includes at least one of channel information, traffic information, a signal strength, frequency spectrum information, or a location of the first apparatus.

6. The method of claim 4, further comprising:
transmitting, to the sender device, route information of the receiver device,
wherein the route information includes at least one of a moving direction of the receiver device and a speed of the receiver device, and
wherein the reception of the connection information is performed based at least in part on the route information of the receiver device.

7. The method of claim 6, further comprising:
comparing the connection information regarding the first apparatus with the route information of the receiver device; and
stopping the reception of the connection information regarding the first apparatus, if the connection information regarding the first apparatus does not correspond to the route information of the receiver device.

8. The method of claim 7, further comprising:
transmitting, to the sender device, the received connection information, if the connection information regarding the first apparatus does not correspond to the route information of the receiver device.

9. A receiver device, comprising:
a receiving unit to receive, from a sender device, connection information regarding a first apparatus that is connected to the sender device, wherein the connection information is received via a machine-to-machine network between the sender device and the receiver device;
a connection control unit to connect to the first apparatus based at least in part on the connection information after the sender device is disconnected from the first apparatus; and
a transmitting unit to transmit the received connection information to a second apparatus that is connected to the receiver device before the connection control unit connects to the first apparatus,
wherein the receiving unit is further to receive, from the second apparatus, a command to disconnect from the second apparatus and to connect to the first apparatus, and the connection control unit is further configured to disconnect from the second apparatus,
wherein the first apparatus includes a first base station, and the second apparatus includes a second base station, and
wherein the connection information includes at least one of channel information, traffic information, a signal strength, frequency spectrum information, or a location of the first apparatus.

10. The receiver device of claim 9, further comprising:
a determination unit to:
compare the connection information regarding the first apparatus with route information of the receiver device, and
control the receiving unit to stop receiving the connection information regarding the first apparatus, if the connection information regarding the first apparatus does not correspond to the route information of the receiver device,
wherein the route information includes at least one of a moving direction of the receiver device, a speed of the receiver device, or a destination of the receiver device.

11. The receiver device of claim 10, wherein the determination unit is further to control the transmitting unit to return the received connection information to the sender device, if the connection information regarding the first apparatus does not correspond to the route information of the receiver device.

12. A non-transitory computer-readable storage medium having stored thereon computer-executable instructions that, in response to execution, cause a receiver device that is connected to a second apparatus to perform operations, comprising:
receiving, from a sender device, connection information regarding a first apparatus that is connected to the sender device, wherein the connection information is received via a machine-to-machine network between the sender device and the receiver device;
receiving, from the second apparatus, a command to disconnect from the second apparatus; and
connecting to the first apparatus based at least in part on the received connection information after the sender device is disconnected from the first apparatus,
wherein the first apparatus includes a first base station, and the second apparatus includes a second base station.

13. The non-transitory computer-readable storage medium of claim 12, wherein the connection information regarding the first apparatus includes at least one of channel information, traffic information, a signal strength, frequency spectrum information, or a location of the first apparatus.

* * * * *